Dec. 26, 1933.  R. W. AYER  1,940,836
RETRACTABLE LANDING GEAR
Filed Aug. 8, 1932   4 Sheets-Sheet 3
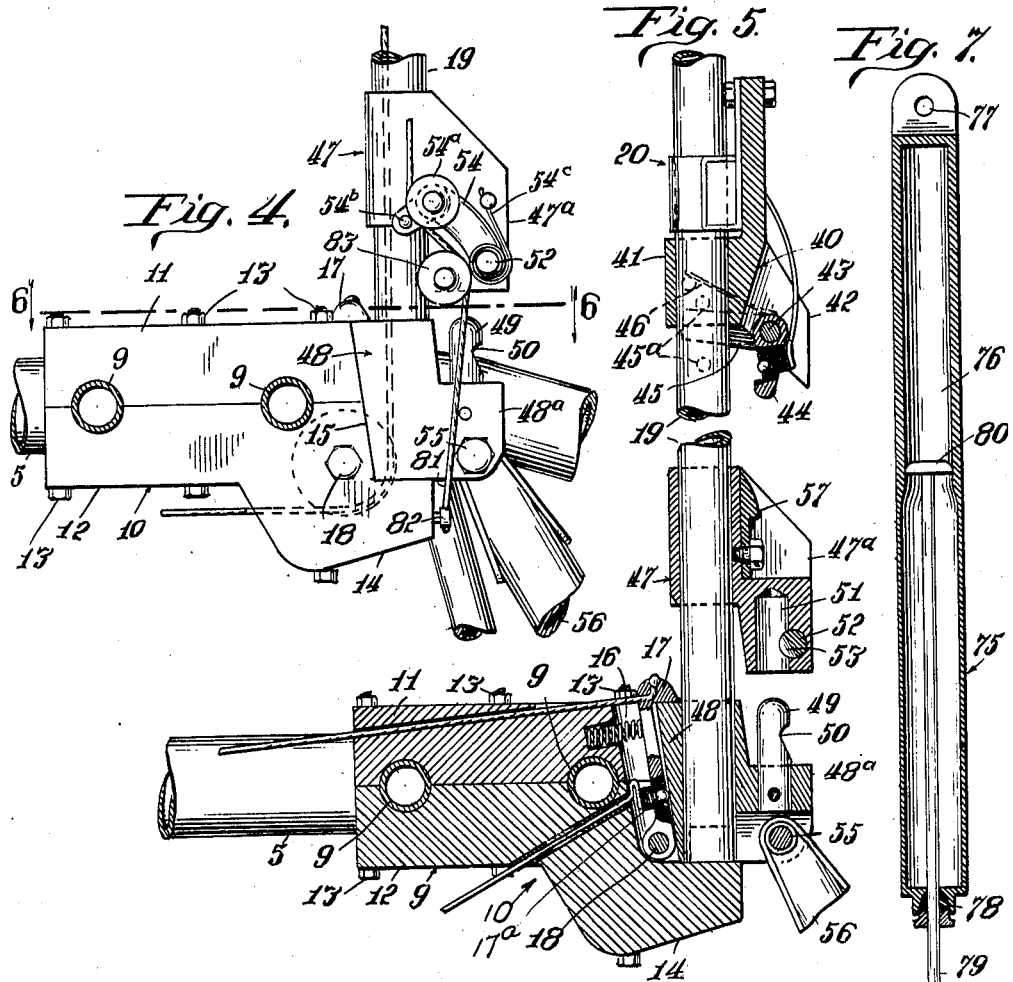
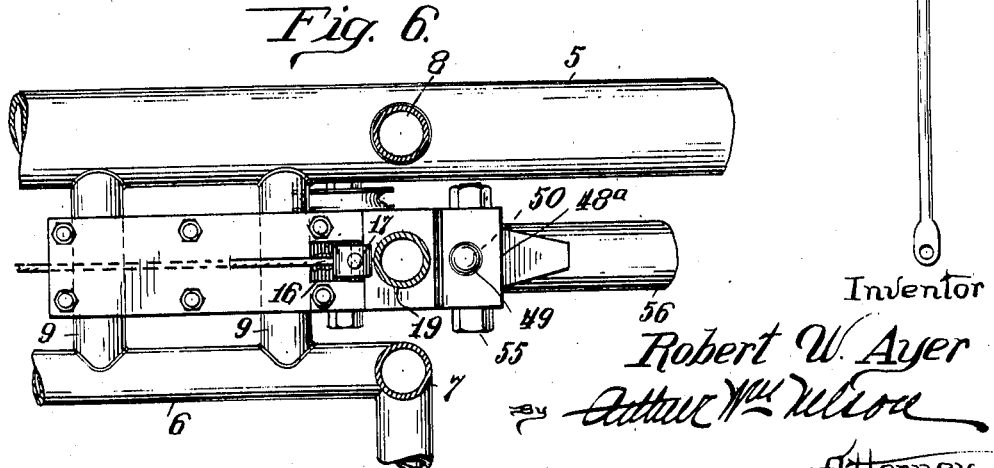
Inventor
Robert W. Ayer
Attorney.

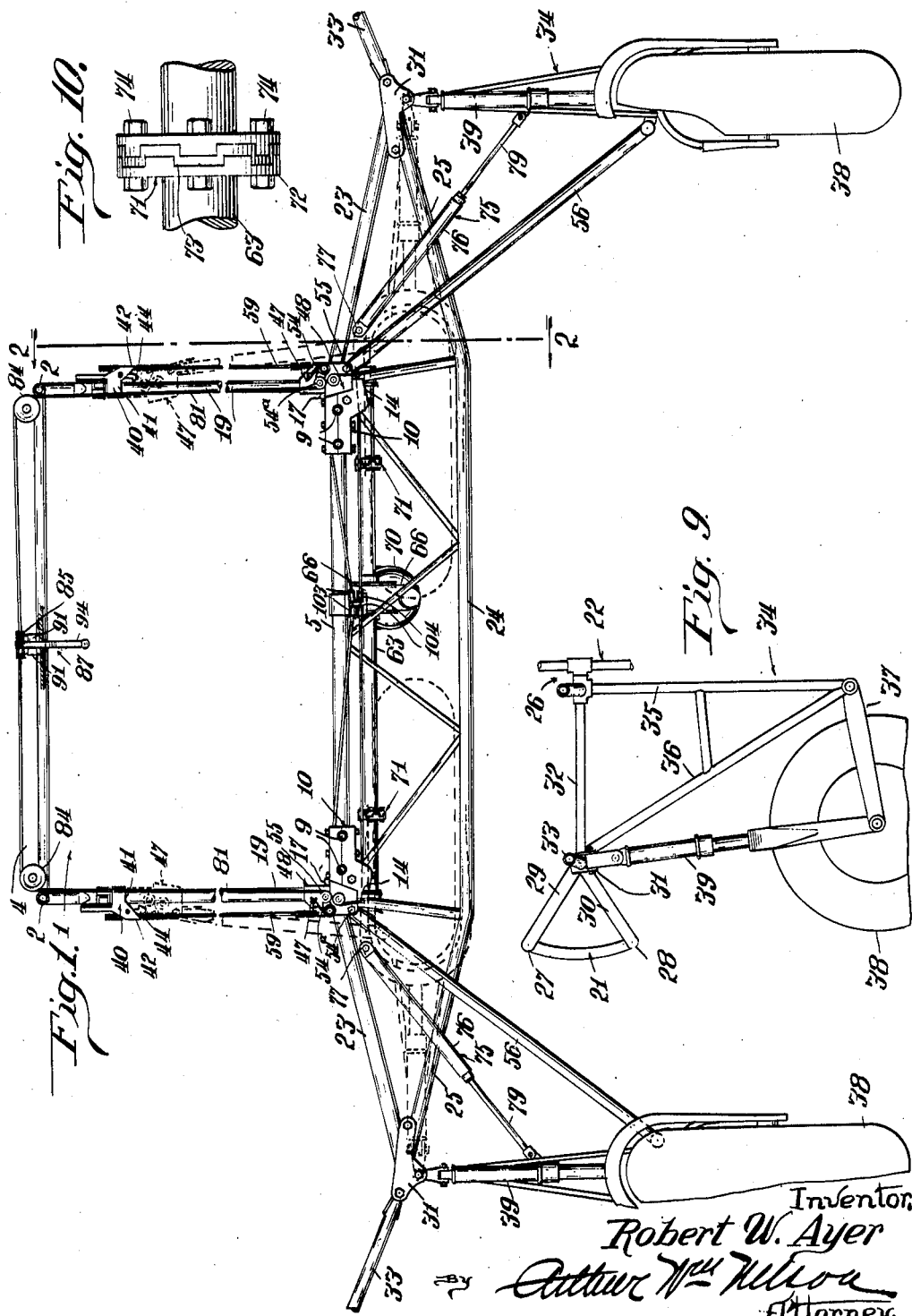

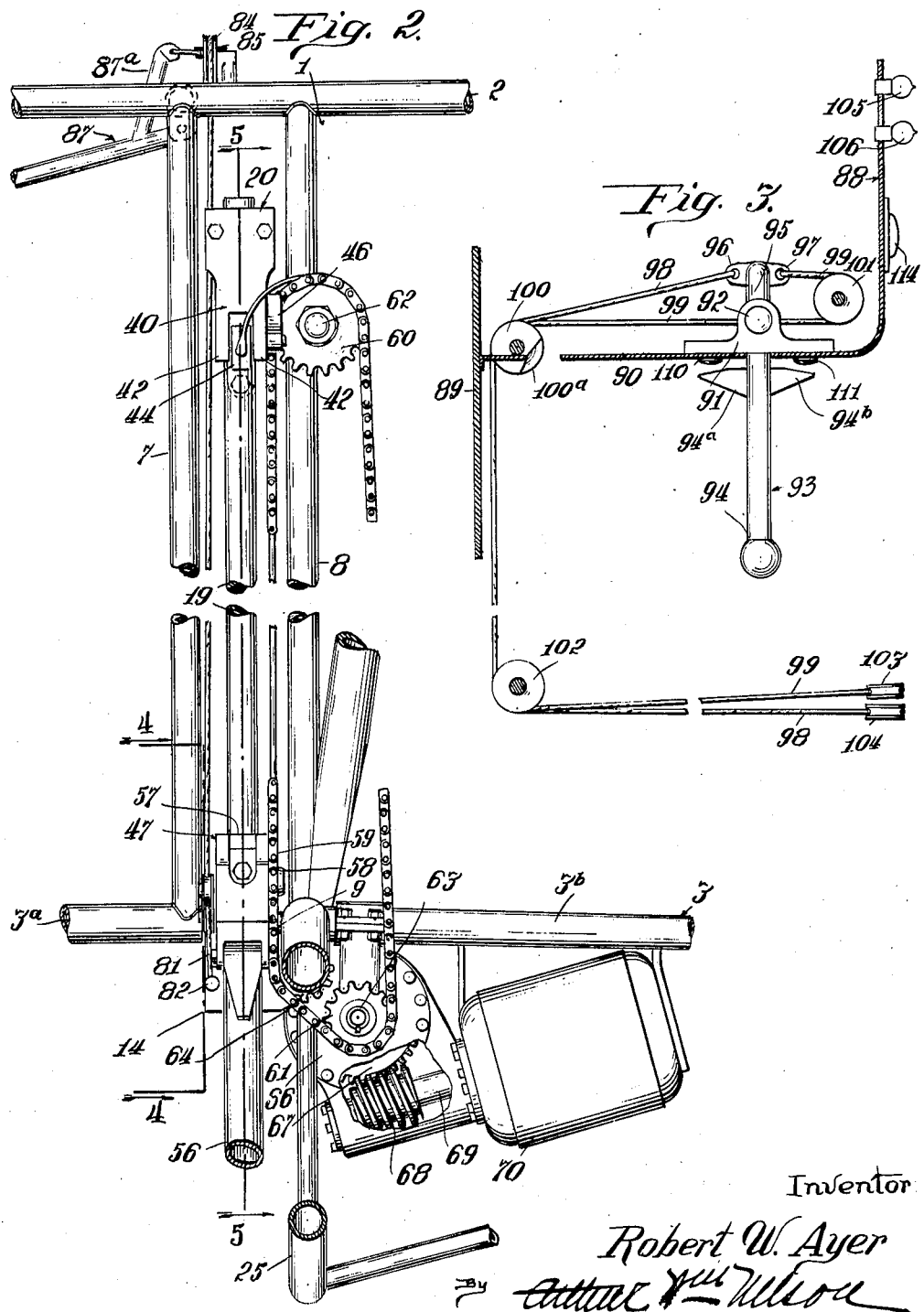

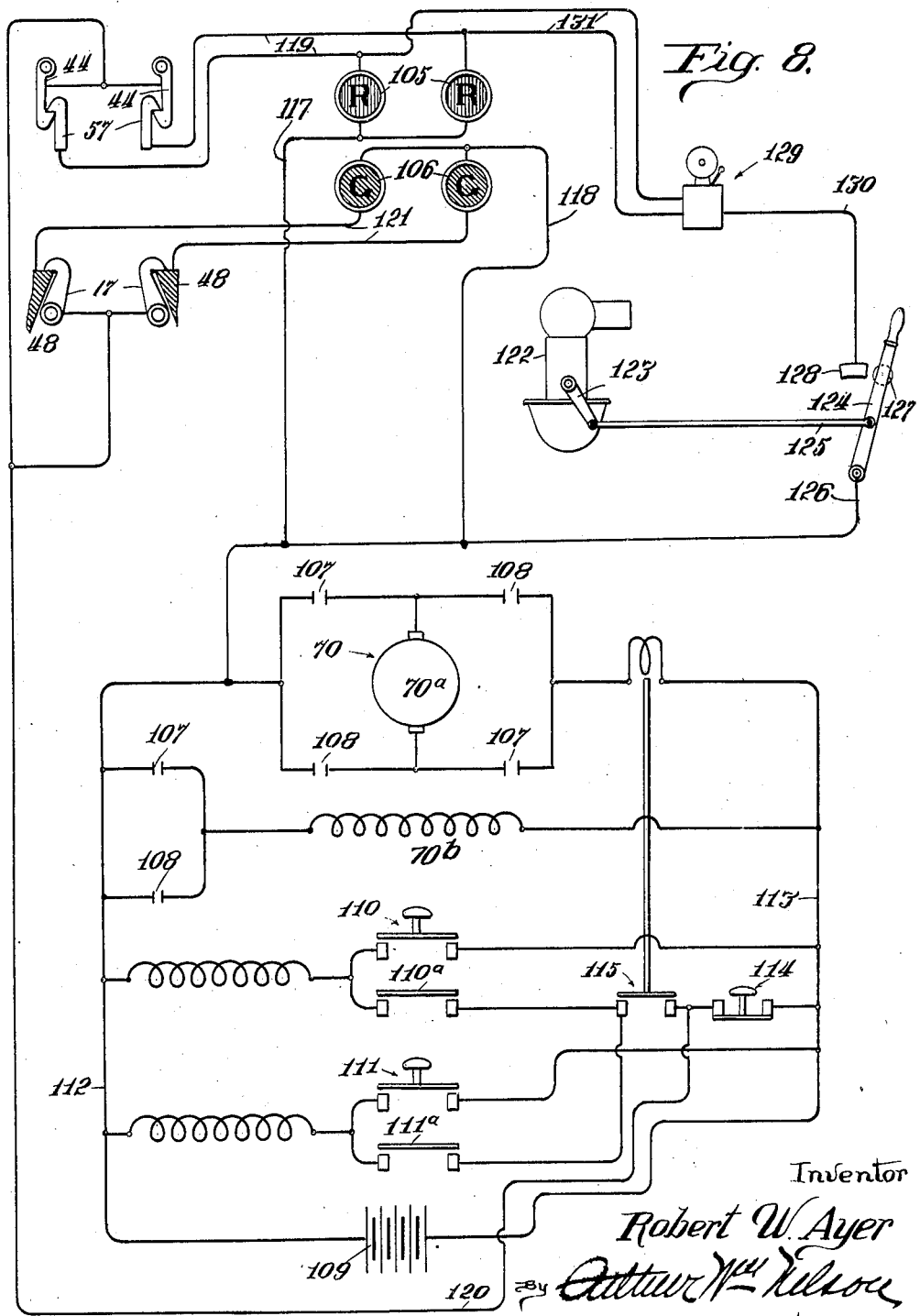

Patented Dec. 26, 1933

1,940,836

UNITED STATES PATENT OFFICE 1,940,836

RETRACTABLE LANDING GEAR

Robert W. Ayer, Wayne, Mich., assignor to Manning & Co., Chicago, Ill., a corporation of Illinois Application August 8, 1932. Serial No. 627,890

30 Claims. (Cl. 244—2)

This invention relates to improvements in retractable landing gears and it consists of the matters hereinafter described and more particularly pointed out in the appended claims.

The primary object of the invention is to provide a gear of this kind for aircraft and which includes a motor and mechanism, for swinging the gear into retracted position and which motor is remotely controlled by suitable switches disposed conveniently for the operator.

Another object of the invention is to provide a gear of this kind, both sides of which are simultaneously actuated by a motor driven shaft and each of which sides includes a positively acting endless chain, for use in the retracting of the gear, the motor driven shaft comprising shaft parts in which is located means that takes care of a nominal misalignment between the two shaft parts and absorbs shocks due to the starting and stopping of the drive of said shaft parts.

A further object of the invention is to provide a gear of this kind including a suitable power actuated mechanism operatively connected to the lifting strut of the gear and which mechanism is so arranged that the lifting strut may be disconnected therefrom at any point in its movement, so that the gear may drop instantly by gravity into landing position without being encumbered by other moving parts.

Still another object of the invention is to provide in a gear of this kind, lift mechanism including power actuated lifting units, formed of interlocking block parts and means whereby said parts may be released from each other to permit quick return of the gear at any point in its movement to landing position.

Still a further object of the invention is to provide in a gear of this kind, a lift block unit slidable on a guide tube and which unit has the lifting strut connected thereto, said unit automatically locking at each limit of its movement to prevent undesired movement of the gear and operating when the gear is in its retracted position to relieve the lift mechanism of flight acceleration loads and carries the same through said units into the structural framing of the aircraft in which the gear is embodied.

Still another object of the invention is to provide in a gear of this kind, means for preventing or retarding the too rapid free drop of the gear in its initial movement toward landing position, said retarding action being removed as said gear approaches landing position so that said movement is more free as landing position is approached whereby the gear may automatically lock in said landing position.

Still a further object of the invention is to provide electrical control means for the gear that includes an operating lever disposed remote from the gear and operable in one direction for controlling the movement into retracted position and operable in the other direction for controlling the movement into landing position, together with a second lever operable only on an emergency device for releasing the landing gear at any point in its movement toward retracted position so that it may instantly move into landing position.

The above mentioned objects of the invention as well as others, together with the many advantages thereof, will more fully appear as I proceed with my specification.

In the drawings:

Figure 1 is a view in front elevation of a retractable landing gear for aircraft embodying the preferred form of my invention and which gear is shown in landing position;

Figure 2 is a longitudinal vertical detail sectional view through the same on an enlarged scale as taken on the line 2—2 of Figure 1.

Figure 3 is a vertical detail sectional view through a portion of the instrument board of the aircraft and illustrates more particularly the control mechanism for releasing the gear from either of its locked positions and for starting the electric motor for swinging the gear from a landing to a retracted position and vice versa and which will be more fully referred to later;

Figure 4 is a detail vertical sectional view on an enlarged scale as taken on the line 4—4 of Figure 2 and illustrates more particularly the mechanism for locking the gear in a landing position;

Figure 5 is another vertical sectional view through a part of the gear as taken on the line 5—5 of Figure 2;

Figure 6 is a detail horizontal sectional view through a part of the gear as taken on the line 6—6 of Figure 4;

Figure 7 is a longitudinal detail sectional view through a telescopic brace embodied in the improved mechanism for retarding the initial part of the swing of the gear toward landing position and for permitting a free swing of the gear in the final part thereof toward landing position when the gear is released from its actuating mechanism;

Figure 8 is a diagrammatic view of the electric circuit embodied in the landing gear;

Figure 9 is a view in side elevation of one of the frames of the gear for carrying a landing member and illustrates the manner in which said frame is operatively connected to the outrigger, and Figure 10 is a detail view in side elevation on an enlarged scale of a connection between parts of an operating shaft embodied in my improved landing gear.

The improved landing gear is especially adapted for use in airplanes, including an outrigger structure suitably secured to the fuselage to the rear of the cowling and beneath the cabin. Said outrigger structure tapers and extends laterally from each side of said fuselage and is operatively braced at its end from the wings and is provided with suitable fairings.

Pivotally connected to each end of the outrigger structure to swing about an axis parallel with the median line of the fuselage, is one end of a rigid frame arrangement, the other end of which is engaged through a drag link with a landing member which as shown herein is a landing wheel. Said wheel is further connected to the first mentioned end of the rigid structure by a telescopic hydraulic shock absorber to dampen the shock of landing impact of the wheel.

Associated with and pivotally connected to each rigid frame arrangement is one end of a rigid strut, the other end of which is operatively connected to a carriage comprising blocks adapted for releasable engagement as a unit and which carriage is arranged for a sliding guided movement upon an upright post arising from a part of the outrigger structure and arranged adjacent the pilot's seat. Also connecting said rigid frame arrangement and a fixed part of the fuselage, is a telescopic strut operative, more particularly when the gear swings toward landing position to regulate the amount of free swing of the gear toward said position. Thus in the initial part of said swing toward landing position the swing is checked and in the final part of said swing toward landing position, said swing is free and thus the jolts and jars of a complete free swing are eliminated.

The carriage movable on said guide tube is of peculiar construction, in that it is made up of a number of interlocking, yet releasable block parts that may move as a unit, and the lifting strut is fixed to the lower block part of the unit which in turn may be locked to the fuselage. The top block part of said unit may be locked to and released from the bottom one as desired and is formed to be locked to and released from a bracket fixed with respect to the top portion of the guide tube. The top block part of the unit is operatively connected to one point of an endless chain passing about top and bottom sprockets arranged adjacent the guide tube and the bottom sprocket is mounted on the outer end of a driven shaft extending transversely of the fuselage beneath the cabin.

This shaft includes shaft parts connected by an equalizing coupling including a rubber block which takes care of a nominal misalignment in the shaft parts and also takes care of shocks in the stopping and starting of the rotation of said shaft parts. Said shaft may be driven in either direction by a reversible motor and interposed worm gearing and suitable control means in the form of switches, controls the direction of rotation of said motor.

To retract the landing gear, the motor is actuated in one direction to drive the cross shaft and the endless chains and this causes the movable blocks to travel as a unit upwardly, (on their guide tube) as a carriage. Through the rigid strut mentioned that is fixed to the bottom block of the unit, the gear is swung in toward retracted position, the top block automatically locking with the bracket previously mentioned, when the gear is fully retracted. Electrical means is provided in the cabin to indicate to the pilot the position of the gear; that is, whether the gear is in the retracted, or in landing position, it being borne in mind that as the gear is disposed in the plane of the faired over outrigger it is not visible to the pilot in the cabin. Should necessity during the retraction of the gear require a quick return of the same, to landing position, means is provided to release the bottom block (to which the lifting strut is connected) from the top block (to which the operating chain is connected) of the carriage so that the gear drops or swings by gravity into landing position. This release can be accomplished no matter what position the carriage may happen to be in on the guide tube.

When the gear is in a retracted position and the pilot throttles the engine to reduce the speed of flight as when approaching a landing, certain means operate to notify the pilot that the gear is in said position. Thus the pilot has opportunity before landing to return the gear to landing position. This means however, is only operative when the gear is in a retracted position and the engine throttle is cut down from a cruising to a landing speed.

In illustrating the invention, only those parts essential thereto are shown in connection with the immediately associated aircraft parts, because as is apparent, the gear may be applied to different types of aircraft and such modification of the gear as will make it applicable to said types, will of course, be dependent upon the particular type of aircraft to which it is desired to apply the gear. Again, the invention is illustrated as adapted for a ground landing and therefore, the landing members are shown as wheels but as will be apparent, pontoons or floats may be substituted for the wheels so that the aircraft can land upon or take off from a body of water.

Referring now in detail to that embodiment of the invention, illustrated in the accompanying drawings: 1 indicates as a whole, a part of an airplane fuselage including top longerons 2 and bottom longerons 3, suitably connected by braces and trusses in the manner well-known, in airplane frames. In this instance, there is shown a transverse top member 4 as connecting the two top longerons together and which member is also adapted as a roof support in a cabin type of plane. Each bottom longeron includes front and rear longitudinally spaced sections 3a and 3b respectively, and the ends of said sections at one side of the fuselage are connected to the ends of the like sections of the bottom longeron on the other side of the fuselage by spaced cross members 5 and 6 respectively. Between the adjacent ends of the front and rear sections 3a—3b of the bottom longeron on each side of the fuselage and the associated top longerons are upright, longitudinally spaced struts 7 and 8 respectively.

The ends of the cross members 5 and 6 at each side of the fuselage are connected together, near the struts 7 and 8 by a pair of laterally spaced longeron members 9—9. Supported on each pair of longerons members 9—9, between the cross members 5 and 6 is a block 10 comprising a pair of top and bottom block members 11 and 12 respectively clamped to said members 9—9 by clamp bolts 13. The outer end of the bottom block member has an extension 14 providing an L-shaped seat 15 for a part of a carriage or slide block assembly as will later appear and opening into said seat and above said extension is a recess 16 as best shown in Figure 5.

In said recess is provided a spring pressed latch 17 pivoted at its bottom end as at 18 in the bottom block member 12, the purpose of said latch appearing later. Between each pair of upright struts 7 and 8 is a tube 19 and said tube is anchored at its bottom end in the extension 14 of its associated block part 12 and is secured at its top end in a bracket 20 extending between and secured at its ends to the struts 7 and 8 near an associated top longeron 2.

The fuselage thus far described, also includes an outrigger structure comprising front and rear outrigger frames 21 and 22 respectively. The rear outrigger frame comprises downwardly and outwardly extending rigger arms 23 forming extensions of the cross member 5 of the fuselage and a bottom truss 24 spaced a suitable distance below the member 5 and including an upwardly and outwardly extending rigger arms 25, the outer ends of said arms 23—25 joining at a bracket 26.

The front outrigger frame which is disposed in a plane in advance of the transverse member 6 of the fuselage, includes top and bottom truss members 27—28 each including at its ends downwardly and outwardly and upwardly and outwardly rigger arms 29 and 30 that angle slightly rearwardly at their outer ends to meet in a bracket 31. Both brackets 26—31 at each side of the fuselage are connected together by a strut 32 and both brackets are connected by struts 33 (see Figure 1) with the associated wing part of the airplane.

The outrigger frames are braced and trussed to provide the necessary rigidity in said outrigger as a whole and are covered with fabric (not shown herein) to reduce resistance to flight.

Associated with the outer end of each outrigger is a substantially V-shaped frame 34 including suitably braced pairs of frame members 35 and 36 which are pivoted at their top ends in the associated brackets 26 and 31 respectively. The bottom ends of said frame members are suitably joined together to the rear end of a drag fork 37. In the front end of said fork is journalled a landing wheel 38 and a telescopic shock absorber 39 connects said front end of the drag fork with the bracket 31. Said shock absorber is so constructed and arranged as to absorb the impact of the associated wheel in making a landing.

Fixed to and depending from each bracket 20 is a stop block 40 that includes an inner boss 41 through which the top end of the slide tube 19 extends and an outwardly and downwardly inclined boss 42. In said boss 42 is provided a rock shaft 43 and secured to said rock shaft is a depending locking dog 44. An inwardly extending arm 45 is fixed to one end of said shaft outside of said stop block. Said arm has secured thereto a leaf spring 46 that normally tends to rock said shaft clockwise within limits defined by a pair of stop pins 45a adapted to be engaged by said arm.

Slidable on the guide tube between the seat 15 before mentioned and said stop block 40, is a carriage comprising a top block part 47 and a bottom block part 48 having their abutting ends formed to engage and fit each other so that said block parts form a separable unit. As best shown in Figure 4 the block parts have stepped portions 47a and 48a and in the stepped portion 48a is an upwardly extending stud 49 with a recess 50 in one side thereof and in the stepped portion 47a, is a recess 51 to receive said stud.

In the stepped portion 47a is a transverse rock shaft 52 having a recess 53 disposed in the plane of the recess 51. This rock shaft is so formed that when rocked in one direction, a part thereof will extend into said recess 51 and when it is rocked in the other direction, it clears this recess. On one end of said shaft, outside the stepped portion 47a is secured one end of an arm 54 and in the other end of said arm is journalled a grooved pulley 54a and associated therewith is a guide pin 54b the purpose of which will appear later. A leaf spring 54c is so fixed at one end to said rock shaft and to the stepped portion 47a respectively, as to normally swing the arm 54 in a counterclockwise direction to normally bring a part of said shaft 52 into the recess 50 of the stud 49 when the top and bottom block parts are engaged with each other. When said block parts are so engaged and the shaft 52 is rocked into a position wherein a portion thereof extends into the recess 50 of the stud 49, said block parts are locked together, and will move as a unit.

When the arm 54 is rocked in a clockwise direction, this will rock the shaft 52 so that it clears the recess 50 in the stud 49 and unlocks and permits separation between said block parts.

The extension 48a of the block part 48 has pivotally connected thereto as at 55, one end of a rigid lifting or retracting strut 56, the other end of which is pivotally connected to the landing member frame 34. On the block part 47, above the extension and disposed in a pocket provided therefor, is a fixed hook-like lug 57 adapted to be detachably engaged by the pawl 44 on the stop block 40.

On the extension 47a of the block part 47 is provided a rearwardly facing lug 58 (see Figure 2) fixed to one point of an endless chain 59 that is trained about top and bottom sprockets 60 and 61 respectively. The top sprocket is suitably journalled on a stud 62 projecting outwardly from the upright strut 8 near the bracket 20 while the bottom sprocket is fixed to the outer end of a driven shaft 63 extending transversely of the fuselage in a plane slightly below the longeron sections 3b and rearwardly of the plane of the upright truss member 8. Associated with said sprocket 61 is an idler direction sprocket 64 suitably journalled on a stud carried by a fixed part of the fuselage.

The central part of the shaft 63 extends through and is journalled in a casing 66 and is provided with a worm gear 67 meshing with a worm 68 on a second shaft 69 arranged in said casing in a plane at a right angle to the plane of the shaft 63. Said casing is fixed to the front end of an electric motor 70 suitably supported from the fuselage in a depending position in the median plane of said fuselage. The armature shaft of this motor is connected to the worm shaft 69 so as to drive the same. In the shaft 63 between the casing 66 and each sprocket 61 is an equalizer coupling 71 best shown in Fig. 10. Said coupling includes spaced metallic plates 72 fixed to respective shaft sections and a rubber block 73 is arranged between said plates, bolts 74 passing through said plates and rubber blocks. Said couplings compensate for a limited amount of disalignment between the sections of the shaft 63 and also absorb the shock of the stopping and starting of said shaft 63.

When the block parts 47 and 48 are locked together and in their lowermost position so that the block part 48 is engaged on its seat 15 on the block part 12, said block part 48 is locked in this position by reason of the latch 17. With said block parts in this position the landing gear is in landing position as best shown in full lines in Figure 1.

When it is desired to retract said gear up into a position disposed within the outrigger as shown in dotted lines in Figure 1, the latch 17 is actuated in opposition to its associated spring, to release its locking engagement with the block part 48 and substantially simultaneously therewith the motor 70 is energized to run in the proper direction. When the motor is thus energized it drives the shaft 63 and causes movement of the chains 59 in that direction that will cause the same to slide the blocks 47—48 as a unit upwardly on the tube 19 toward the stop block 40.

As the blocks 47—48 as a unit approach the stop block 40, the hook-like lug 57 on the block part 47 will engage the bottom end of the spring pressed pawl 44 in the stop block and will cause it to swing outwardly to clear said lug and then snap into locking engagement therewith. As will appear later, means is provided for automatically stopping the motor at this time.

In the upward movement of the blocks 47—48 as a unit on the guide tube 19, a lift is imparted to the associated end of the rigid strut 56 and this will tend to swing the wheel frame 34 upwardly and inwardly into a substantial horizontal position with the framing of the outrigger. When the gear is in its fully retracted position, its weight is borne by the lug 57 and pawl 44 and is then transferred through the stop block 40 to the fuselage.

When it is desired to swing the gear to landing position, the arm 45 in the stop block is swung in a manner to release the engagement between the pawl 44 and lug 57 and substantially simultaneously therewith the motor 70 is energized to cause it to run in the other direction. Through the shaft 63 the chain 59 is caused to run in a corresponding direction, which will cause the blocks 47—48 as a unit, to move downwardly on the tube 19 toward the seat 15 as provided by the extension 14 on the clamp blocks 11 and 12. As the bottom end of the block part 48 approaches and engages the top end of the latch 17, said latch is pushed laterally out of the way so that said block can pass the same and so soon as said block engages on its seat 15 said latch snaps back and locks said block rigidly in place. Thus the landing impact of the landing wheel is transmitted through said latch to the fuselage.

In the movement of the blocks 47—48 as a unit, upwardly or downwardly upon the tube 19, an emergency might arise, wherein necessity requires an instant movement of the gear into landing position. To accomplish the same, the arm 54 is swung in a clockwise direction and this disengages the shaft 52 in the block part 47 from the lug 49 on the block part 48. This permits of a separation of the block part 48 from the block part 47 so that the wheel carrying frame, can swing under a gravity action into landing position. As before mentioned when the block part 48 approaches its seat 15 at the bottom end of its movement on the guide tube, it forces the latch 17 out of the way and when said block part engages on said seat, the latch snaps back to lock the parts in landing position as before.

After such a separation of the block parts, the block part 47 can be moved downwardly on the tube and as it approaches the now locked block part 48, the lug 49 therein then enters the recess 50 in the block part 47 and the parts are again locked together by reason of the engagement of the shaft 52 in the recess of said lug 49.

It is apparent that if the free swing of the gear from a retracted position to a landing position, were not controlled, a heavy shock or jar would be imparted to the fuselage as the block part 48 reaches its locked position on the seat, 15. To eliminate this objection, I provide at a point between the fuselage and the landing gear frame 34, a means for retarding the initial part of said free swing and which retarding means eases off as the gear approaches landing position so that the last part of said swing is substantially free whereby a positive locking engagement is assured by the latch 17 with the block part 48.

Said means comprises a dash pot-like telescopic brace 75 (see Figures 1 and 7) which includes a hydraulic cylinder 76 that is pivoted at one end as at 77 to a part fixed with respect to the fuselage, and is provided at its opposite end with a stuffing box 78. A piston rod 79 slides through said stuffing box and is provided with a piston 80 at that end within the cylinder and is pivoted at its other to the landing gear frame 34. The cylinder is filled with a hydraulic fluid and the piston fits comparatively snug in that end of the cylinder that is pivoted to the fuselage. The other end of the cylinder is enlarged internally as best shown in Figure 7.

When the gear is in its retracted position, and it is necessary to quickly return the same to landing position and the blocks 47—48 are released for separation, the free swing of the gear is retarded in the initial part of its movement due to the rather snug engagement of the piston 80 in the pivoted end of the cylinder. However, when the piston reaches that part of the cylinder that is internally enlarged the restraining action of the piston is released and the landing gear is practically free of retardation in the final part of its swing.

To operate the arm 54 so as to rock the shaft 52 and thus permit separation of the block parts 47—48 no matter what position as a unit they may happen to be in, I provide the following mechanism:

81 indicates a flexible cable that is fixed at its bottom end to the outer face of the block extension 14 as at 82. Said cable extends upwardly therefrom about one side of a guide pulley 83 on the block part 47 and then is wrapped at least a complete turn about the pulley 54a on the rock arm 54 from the other side, being held from displacement thereon by the pin 54b before mentioned.

From the pulley 54a, said cable extends upwardly to pass about a pulley 84 journalled on a horizontal stud fixed with respect to a part of the fuselage such as the strut 4 near the upper longerons 2. Said cable then leads inwardly toward another pulley 85 mounted to turn about a vertical stud supported near the middle of the strut 4. A lever 87 is pivoted to said strut so as to be within convenient reach of but overhead the pilot and said lever includes an arm 87a to which the associated end of the cable is connected after passing about the pulley 85. In this respect, it is pointed out that the emergency release cables for the mechanism at both sides of the fuselage are connected to the said lever because it is always desired that the frames at each end of the outrigger, move in unison into and out of landing position.

When the pilot grasps said lever and pulls downwardly thereon, this exerts an upward pull on the cable between its anchored end and the pulley 85 and tends to shorten this part of the cable. In this shortening or taking up in this part of the cable, the action is to impart a short upward swing to the arm 54 through the pulley 54a thereon. As the shaft 52 is fixed to said arm, said shaft is rocked to clear itself from the stud 49 in the block 48 and permits a release and separation between the block parts 47 and 48 and lets the gear swing by gravity into landing position.

When said arm 54 is thus swung upwardly, its associated leaf spring 54c is tensioned and when the pilot releases his grasp upon the lever 87, the spring acts to return said arm 54 to its normal position and exert a pull on the cable 81 in such a direction that the lever 87 is restored to its normal position. When the arm 54 is in said normal position, the blocks 47—48 may move upwardly or downwardly under the driving action of the motor 70 as when retracting or extending the gear, that part of the cable passing about the pulley 54a merely acting as a running loop.

It is apparent that the latch 44 in the stop block 40 and the latch 17 in the clamping block 10 are remotely located from the pilot's seat in the cabin of the plane. Means is provided whereby such latches may be actuated by the pilot when in said seat and such means is as follows:

88 indicates the instrument board in the cabin of the plane, a short distance to the rear of the dash pan 89 and the bottom end of said board is connected to said pan by a horizontal wall 90, so as to provide a compartment between said board and pan. On said wall 90 within said compartment is located a bracket 91. Pivoted in said bracket as at 92 is a lever 93, including a bottom actuating arm 94 depending below the wall 90 within easy reach of the pilot and a shorter top arm 95 disposed within said compartment. The short arm 95 includes pairs of front and rear ears 96 and 97 respectively to which are secured the ends of pairs of cables 98 and 99 respectively.

The pair of cables 98 extend forwardly to be trained about the top side of a pair of pulleys 100 journalled in brackets on the wall 90 near the dash pan while the pairs of cables 99 extend rearwardly to be trained about the top of a second pair of pulleys 101 journalled in suitable brackets on the wall 90 near the instrument board 88. Said last mentioned pair of cables lead off the bottom side of the pulleys 101 and extend forwardly therefrom to be trained about the top sides of pulleys 100a associated with the pulleys 100.

Both pairs of cables then extend downwardly from the pulleys 100—100a to pass about a set of pulleys 102 which are disposed beneath the floor of the cabin, not shown.

Both sets of cables lead rearwardly from off the bottom side of the pulleys 102 and are trained about pairs of top and bottom directional pulleys 103 and 104 respectively, suitably supported from the fuselage.

The cables of the pair 99, pass about the top pulleys 103 and each cable then extends laterally in opposite directions to be secured to its associated latch 17. The cables of the pair 98 pass about the bottom pulleys 104 and extend laterally therefrom, to pass about the bottom of another pulley supported on the block 10 and then upwardly to be attached to the associated arm 45.

By the arrangement described, it is apparent that when the lever arm 94 is pushed forwardly it imparts a pull to the cables 98 and this pull is exerted as a force to impart a downward pull on the associated arms 45 against the action of the springs 46 to rock the shafts 43 to release the slide block parts 47 from the stop blocks 40. When the arm 94 is pulled rearwardly, this will exert a pull on the cables 99 and this pull is exerted as a force on the latches 17 against the action of their springs to release their engagement from the associated bottom blocks 48. It is apparent that by the means described, the pilot can actuate the said latches to release them from their locked engagement with the block parts 47—48 and this actuation is carried out from a point remote from said block parts.

So that the locked or unlocked condition of said latches and dogs may be readily and visibly made known to the pilot, whose position in the cabin is such as to prevent his actual seeing of the condition the landing gear is in, I provide indicator means on the instrument board 88. Such means preferably comprises two pairs of different colored electric lights 105 and 106 respectively, the former being red lights and the latter being green lights.

The green lights are associated, one with each latch 17, while the red lights are associated, one with each dog 44. A suitable circuit is provided for the various lights and which circuit operates to energize said lights only when the respective latches and dogs are in the fully engaged position with their associated block parts 47—48.

The motor 70 is of the reversable type and includes an armature 70a and a field 70b and sets of switches 107 and 108 control the flow of current from a battery 109 to the armature and field of the motor respectively. A manually operable switch 110 controls the controlling switches 107 for said armature and field and a second and similar manually controlled switch 111 controls the control switches 108 for said field and armature. These last mentioned switches 110 and 111 which are of the push button type are supported by and depend from the wall 90 in a position to be engaged by extensions 94a—94b on the arm 94 and the lever 93 when the same is swung forwardly or rearwardly to retract or project the landing gear.

Leading from both sides of the battery toward the switches 107—108 are conductors 112 and 113 respectively and associated with each switch 110—111 is a holding switch 110a and 111a respectively. A normally closed, push button stop switch 114 also amounted on the instrument board 88 controls the flow of current to the switches 110—111 and holding switches 110a and 111a respectively, through a normally closed jam relay switch 115.

When it is desired to retract the landing gear, the lever arm 94 is swung rearwardly and this first releases the latches 17 as before described and then closes the switch 110. This completes a circuit to the field and armature of the motor 70 so that the motor runs in that direction tending to move the blocks 47—48 as units, upwardly on their associated slide tubes 19. As the blocks 47 approach the stop blocks 40 and engage therewith and stop, this causes a high current flow in the motor so that the jam relay switch 115 operates to break the circuit to the holding switch 110a, which opens to deenergize and stop the motor, after which the jam relay switch again closes. Thus the motor circuit is dead because the switches 110—110a are open.

When it is desired to project the gear into landing position, the lever arm 94 is swung forwardly and this first releases the latches 44 as before described and then closes the switch 111. This completes the circuit to the associated holding switch 111a and to switches 108 of the field and armature of the motor 70 so that the motor runs in that direction tending to move the blocks 47—48 as units downwardly on their slide tubes. As the blocks 48 engage their seats 15 on the blocks 10 and stop, this causes a high current flow to the motor so that the jam relay switch 115 operates to break the circuit to the holding switch 111a and this stops the motor.

The red lights 105 are both connected on one side as at 117 with the conductor 112 that leads back to the other side of the battery and the green lights are also both connected on one side as at 118 to said conductor. Each red light is electrically connected to an associated hook lug 57 on a block part 47 by conductors 119 and each pawl 44 is provided with a yielding contact 44a (see Fig. 5) to engage the block 48 and each contact is connected by a conductor 120 to the battery in a manner to be controlled by the stop switch 114 before mentioned.

Each green light is electrically connected by conductors 121 to an associated block part 48 and both latches 17 are connected to the conductor 120 before mentioned, the latches each carrying a spring pressed contact 17a for engagement with the block part 48.

When the gear is locked in its retracted position, by the engagement of the pawls 44 and lugs 57 current passes through the conductor 120 and pawls and lugs and thus energize the red lamps to an "on" condition.

It is apparent that by means of the red and green light the pilot is advised when the gear is locked in either its retracted or landing position and when the red lights indicate that the gear is locked in its retracted position the green lights are "off" and when the gear is locked in its landing position the green lights so indicate the same and the red lights are "off".

After a long flight and wherein the gear is in its retracted position and this is so indicated to the pilot by the red lights, and a landing is about to be made, the pilot naturally decelerates the speed of the plane by throttling down the engine. When about to make a landing, the landing gear should first be projected into landing position but should the pilot forget to manipulate the mechanism therefor, an alarm is sounded to advise him of the fact that the gear is still retracted.

Means is provided whereby when the throttle is closed down, preparatory to a landing, such an alarm is as follows:

In Figure 8 is illustrated diagrammatically the carburetor 122 for the engine of the airplane and which carburetor includes a throttle arm 123. On the instrument board or elsewhere in a position convenient for the pilot is pivoted a throttle arm actuating lever 124 connected to said arm by a link 125. Said lever is connected as at 126 with the conductor 112 and carries a contact 127 for engagement with a fixed contact 128.

An alarm signal device in the form of a bell 129 is located on the rear side of the instrument board and one side of said bell is connected by a conductor 130 with the contact 128 while the other side of said bell is connected by a pair of conductors 131 one with each of the conductors 119 for the red lights 105.

When a landing field is being approached after a flight and the pilot cuts down the engine speed, he swings the lever 124 counterclockwise as shown in Figure 8 and this through the link closes down the throttle of the carburetor. In this movement of the lever 124, its contact 127 engages the contact 128. Thus with the landing gear locked in its retracted position and with the red lights 105 "on", a circuit is completed to the bell 131 through to the ground 126 and the bell operates to produce an audible signal. When the pilot hears this signal, he pushes the lever arm 94 forwardly and this releases the pawls 44 and closes the switch 111 so that the motor is energized to cause a projection of the gear into landing position as before explained.

It is apparent from the above, that should it be necessary during the retraction or projection of the gear, to stop the same in an intermediate position, this may be done by actuating the switch 114 to stop the motor, the gear being held in this intermediate position by the action of the worm gearing associated with the motor. To complete the retraction or projection as the case happens to be or to change from one to the other, the lever arm 94 is swung in the proper direction and the operation will be as before described.

While in describing the invention, I have referred in detail to the form, arrangement and construction of the various parts embodied therein, the same is to be considered merely as illustrative so that I do not wish to be limited thereto except as may be specifically set forth in the appended claims.

I claim as my invention:

1. In combination with the fuselage of an aircraft, a landing gear including a landing member and a frame therefor pivotally connected to the fuselage for a swinging movement from a landing position to a retracted position and vice versa, a strut member operatively connected at one end to said frame, means movable in a guided path on the fuselage and to which the other end of the strut member is operatively connected, and means for releasing said other end of the strut member from said movable means at any point in its movement.

2. In combination with the fuselage of an aircraft, a landing gear including a landing member and a frame therefor pivotally connected to the fuselage for a swinging movement from a landing position to a retracted position and vice versa, a strut member operatively connected at one end to said frame, means movable in a guided path on the fuselage and to which the other end of the strut member is operatively connected, means for releasing said other end of the strut member from said movable means at any point in its movement and means for actuating said releasing means at a point remote therefrom.

3. In combination with the fuselage of an aircraft, a landing gear including a landing member and a frame therefor pivotally connected to the fuselage for a swinging movement from a landing position to a retracted position and vice versa, a strut member operatively connected at one end to said frame, means movable in a guided path on the fuselage and including a plurality of parts to one of which parts the other end of said strut member is operatively connected and means for releasing said first mentioned part from the other of said parts at any point in the movement of said means movable in a guided path on the fuselage.

4. In combination with the fuselage of an aircraft, a landing gear including a landing member and a frame therefor pivotally connected to the fuselage for a swinging movement from a landing position to a retracted position and vice versa, a strut member operatively connected at one end to said frame, means movable in a guided path on the fuselage and including a plurality of parts to one of which parts the other end of said strut member is operatively connected, means for releasing said first mentioned part from the other of said parts at any point in the movement of said means movable in a guided path on the fuselage, and means for actuating said releasing means at a point remote therefrom.

5. In combination with the fuselage of an aircraft, a landing gear including a landing member and a frame therefor pivotally connected to the fuselage for a swinging movement from a landing position to a retracted position and vice versa, a strut member operatively connected at one end to said frame, means movable in a guided path on said fuselage between top and bottom positions and to which the other end of said strut member is operatively connected, power actuated means for positively moving said movable means from one position to the other, releasable means for locking said means movable in said guided path in either said top or bottom positions and means for releasing the strut member from said means movable in said guided path at any point between said top and bottom positions.

6. In combination with the fuselage of an aircraft, a landing gear including a landing member and a frame therefor pivotally connected to the fuselage for a swinging movement from a landing position to a retracted position and vice versa, a strut member operatively connected to said frame, means movable in a guided path on said fuselage between top and bottom positions and including parts adapted to be locked together and to one of which parts the other end of said strut member is operatively connected, power actuated means for positively moving said movable means from one position to the other, releasable means for locking said means movable in said guided path in either said top or bottom position and means for releasing that part of said last mentioned means from the other part thereof at any point between said top and bottom positions to permit said frame to swing into landing position.

7. In combination with the fuselage of an aircraft, a landing gear including a landing member and a frame therefor pivotally connected to the fuselage for a swinging movement from a landing position to a retracted position and vice versa, a strut member operatively connected to said frame, a plurality of separable blocks releasably locked together for movement as a unit in a guided path on said fuselage between top and bottom positions thereon and one of said blocks including a rock shaft releasing device, power actuated means for positively moving said blocks as a unit from one position to the other, releasable means for locking said unit in both the top and bottom positions and means operable to rock said shaft to separate said blocks at any point between said top and bottom positions to permit said frame to swing into landing position.

8. In combination with the fuselage of an aircraft, a landing gear including a landing member and a frame therefor pivotally connected to the fuselage for a swinging movement from a landing position to a retracted position and vice versa, a strut member operatively connected to said frame, a plurality of separable blocks releasably locked together for movement as a unit in a guided path on said fuselage between top and bottom positions thereon and one of said blocks including a rock shaft releasing device, power actuated means for positively moving said blocks as a unit from one position to the other, releasable means for locking said unit in both the top and bottom positions, an operating arm on said rock shaft and means for actuating said arm to rock the shaft to cause separation between said blocks at any point between top and bottom positions to permit said frame to swing into landing position.

9. In combination with the fuselage of an aircraft, a landing gear including a landing member and a frame therefor pivotally connected to the fuselage for a swinging movement from a landing position to a retracted position and vice versa, a strut member operatively connected to said frame, a plurality of separable blocks releasably locked together for movement as a unit in a guided path on said fuselage between top and bottom positions thereon and one of said blocks including a rock shaft releasing device, power actuated means for positively moving said blocks as a unit from one position to the other, releasable means for locking said unit in both the top and bottom positions, an operating arm on said rock shaft and a flexible member engaged by a part on said arm throughout its movement toward either the top or bottom position and means operating to tauten said flexible member at any point in the movement of the blocks as a unit to actuate said rock shaft and release said parts to permit the said frame to swing into landing position.

10. In combination with the fuselage of an aircraft, a landing gear including a landing member and a frame therefor pivotally connected to the fuselage for a swinging movement from a landing position to a retracted position and vice versa, a strut member operatively connected to said frame, a plurality of separable block parts releasably locked together for movement as a unit in a guided path on said fuselage between top and bottom positions thereon, power actuated means secured to one of said parts for moving said parts as a unit between said positions, the other of said parts having the other end of said strut member operatively connected thereto, means for releasably locking said unit in either of said positions and means for releasing said other block part from the first mentioned one at any point between said top and bottom positions.

11. In combination with the fuselage of an aircraft, a landing gear including a landing member and a frame therefor pivotally connected to the fuselage for a swinging movement from a landing position to a retracted position and vice versa, a strut member operatively connected to said frame, a plurality of separable block parts releasably locked together for movement as a unit in a guided path on said fuselage between top and bottom positions thereon, power actuated means secured to one of said parts for moving said parts as a unit between said positions, the other of said parts having the other end of said strut member operatively connected thereto, means for releasably locking said unit in either of said positions, one of said block parts carrying a rock shaft for engagement with a part on the other block for releasably locking them together and means for rocking said shaft at any point in the movement of said block parts as a unit to release said other block from the first mentioned one at any point in the movement of said block parts as a unit.

12. In a landing gear, a guide, a pair of blocks slidable as a unit between top and bottom positions, means connected to one of said blocks for imparting movement to said blocks as a unit from one position to the other, a landing gear strut connected to the other block, a rock shaft in the first mentioned block for engagement with a part on the other block, a spring pressed arm connected to the rock shaft and carrying a guide and a cable capable of engagement with the guide and operable when tautened to actuate the arm to rock the shaft and release the block parts.

13. In combination with the fuselage of an aircraft, a landing gear including a landing member and frame pivotally connected to the fuselage for a swinging movement from a landing position to a retracted position and vice versa, means operatively connected to said frame for swinging the same toward and into a retracted position, means for releasing said frame from said first mentioned means to permit said frame to swing toward landing position under the action of gravity and means operative as the frame swings toward landing position for checking said swing in the initial part thereof.

14. In combination with the fuselage of an aircraft, a landing gear including a landing member and frame pivotally connected to the fuselage for a swinging movement from a landing position to a retracted position and vice versa, means operatively connected to said frame for swinging the same toward and into a retracted position, means for releasing said frame from said first mentioned means to permit said frame to swing toward landing position under the action of gravity and means operative as the frame swings toward landing position for checking said swing in the initial part thereof, and for freeing said swing in the final part thereof.

15. In combination with the fuselage of an aircraft, a landing gear including a landing member and frame pivotally connected to the fuselage for a swinging movement from a landing position to a retracted position and vice versa, means operatively connected to said frame for swinging the same toward and into a retracted position, means for releasing said frame from said first mentioned means to permit said frame to swing toward landing position under the action of gravity and hydraulic means between said fuselage and frame and operative as the frame swings toward landing position to first retard said swing and then to freely permit said swing.

16. In combination with the fuselage of an aircraft, a landing gear including a landing member and frame pivotally connected to the fuselage for a swinging movement from a landing position to a retracted position and vice versa, means operatively connected to said frame for swinging the same toward and into a retracted position, means for releasing said frame from said first mentioned means to permit said frame to swing toward landing position under the action of gravity and a cylinder and piston operatively connected to said fuselage and frame respectively, said cylinder and piston being formed to retard the initial part of the swing of the frame toward landing position and then to freely permit the final part of the swing toward landing position.

17. In a landing gear, a guide, a pair of blocks slidable as a unit between top and bottom positions on said guide, means associated with said guide at said positions for locking the blocks as a unit in one position or the other and means for separating said blocks at any point between said positions.

18. In a landing gear, a guide, blocks fixed with respect to the top and bottom ends of said guide, a pair of top and bottom blocks movable as a unit on said guide between said fixed blocks, means on said movable blocks operating automatically as they approach either the top or bottom fixed block to lock the same thereto, means for releasing said blocks as a unit from either fixed block and means operable to separate said movable blocks at any point between said top and bottom fixed blocks.

19. In a landing gear, a guide, blocks fixed with respect to the top and bottom ends of said guide, a pair of top and bottom blocks movable as a unit on said guide between said fixed blocks, spring pressed latches carried by said fixed blocks for lockingly securing said movable blocks as the same approaches said fixed blocks and means for releasing said movable blocks from each other at any point in their movement as a unit.

20. In combination with the fuselage of an aircraft and landing gear pivoted thereto for a swinging movement into and out of landing position, means including a pair of normally locked together but separable top and bottom blocks movable as a unit in a guided path on said fuselage, coacting means on said blocks and fuselage for locking the blocks as a unit in either of two positions corresponding to the landing and retracted positions of said gear respectively, power actuated means for imparting movement to said blocks as a unit in both directions and including a driving motor, control means remote from said motor and operative to first release said locking means and then to energize said motor and means for releasing one block part from the other no matter what position they occupy as a unit in their movement from one position to the other.

21. In combination with the fuselage of an aircraft, landing gear including a landing member and a supporting frame one on each side of the fuselage and pivoted thereto for a swinging movement from a landing to a retracted position and vice versa, a carriage associated with each frame and movable in a guided path on the fuselage from one position to another for imparting a swinging movement to both frames in the proper direction, means for locking said carriages in either limit of their movement in said one position or the other, a motor and associated means operative to impart movement to said carriage from one position to another, said associated means including shafts driven by said motor and endless chains driven by said shafts and connected to a part of said carriage, means operative to release said carriage from its locked position at either limit of its movement and for energizing said motor to cause the same to run in the proper direction and means for releasing a second part of said carriage from the first mentioned part to disconnect said landing gear frames from said chains.

22. In a landing gear of the kind described, a fuselage and a guide tube at either side thereof, a carriage slidable on each tube from a top position to a bottom position, releasable means for locking both carriages in either position, an endless chain connected to each carriage, a motor capable of running in either direction, shaft parts driven by said motor and including shock absorbing and misalignment compensating means and operative to drive both chains and means operable to first release said carriages from either position in which they are locked and for energizing the motor to run in the desired direction to cause said carriages to move toward their other position.

23. In combination with the fuselage of an aircraft, landing gear therefor, including a landing member frame at each side of said fuselage and movable from a landing position to a retracted position and vice versa, means for controlling the speed of the aircraft when in flight and including a throttling device, and means operating to produce a signal upon actuating said device to reduce said speed in flight when said landing frames are in a retracted position.

24. In combination with the fuselage of an aircraft, landing gear therefor, including a landing member frame at each side of said fuselage and movable from a landing position to a retracted position and vice versa, means for controlling the speed of the aircraft when in flight and including a throttling device, means for visibly indicating to the pilot the retracted and landing positions of said landing member frames and means operating to produce a signal upon actuating said device to reduce said speed in flight when said last mentioned means is indicating that the landing gear frames are in a retracted position.

25. In combination with the fuselage of an aircraft, landing gear therefor, including a landing member frame at each side of said fuselage and movable from a landing position to a retracted position and vice versa, means for controlling the speed of the aircraft when in flight and including a throttling device, means for visibly indicating to the pilot the retracted and landing positions of said landing member frames and means operating to produce a signal upon actuating said device to reduce said speed in flight when said landing member frames are in a retracted position, said signal means being inoperative upon actuating said device to reduce said speed in flight when said landing frames are in a landing position.

26. In combination with the fuselage of an aircraft, landing gear therefor, including a landing member frame at each side of the fuselage and movable from a landing to a retracted position and vice versa, means for controlling the speed of the aircraft when in flight and including a throttling device, an electrically operable signal for indicating one position of the landing member frame, and means operable upon actuation of said device to reduce the speed of flight and to energize said signal to actuate the same when said frame is in said one position.

27. In combination with the fuselage of an aircraft, landing gear therefor, including a landing member frame at each side of the fuselage and movable from a landing to a retracted position and vice versa, means for controlling the speed of the aircraft when in flight and including a throttling device, an electrically operable signal for indicating one position of the landing member frame, and a circuit therefor and means operable upon actuation of said device to reduce the speed of flight and to change the condition of said circuit to induce operation of said signal when said frame is in said one position.

28. In combination with an airplane, landing gear therefor movable from a landing to a retracted position and vice versa, a motor having a field and armature, means between said motor and gear for imparting movement to said gear from either position to the other, a source of current supply for the motor, a circuit for said motor and including manually operable switches to start said motor in either direction, relays in said circuit each associated with a manually operable switch and each operating when its associated switch is operated, to establish and hold a connection between desired sides of the motor field and armature respectively, with said source of current supply so that said motor runs in the desired direction, and an automatic switch also arranged in said circuit for breaking said connection of the relay when said gear reaches said other position.

29. In combination with an airplane, landing gear therefor movable from a landing to a retracted position and vice versa, a motor having a field and armature, means between said motor and gear for imparting movement to said gear from either position to the other, a source of current supply for the motor, a circuit for said motor and including manually operable switches to start said motor in either direction, relays in said circuit each associated with a manually operable switch and each operating when its associated manually operable switch is so operated, to establish and hold a connection between desired sides of the motor field and armature respectively with said source of current supply so that said motor runs in the desired direction, and an automatic switch also arranged in said circuit and operating at a high current value in the motor armature when said gear reaches said other position for stopping the motor.

30. In combination with an airplane, landing gear therefor movable from a landing to a retracted position and vice versa, a motor having a field and armature, means between said motor and gear for imparting movement to said gear from either position to the other, a source of current supply for the motor, a circuit for said motor and including manually operable switches to start said motor in either direction, relays in said circuit each associated with a manually operable switch and each operating when its associated manually operable switch is so operated, to establish and hold a connection between desired sides of the motor field and armature respectively, with said source of current supply so that said motor runs in the desired direction, an automatic switch also arranged in said circuit for breaking said connection of said relay in said circuit when said gear reaches said other position, and a third manually operable switch in said circuit for breaking said connection independently of said automatic switch and whereby the motor may be stopped in a position corresponding to a position of said gear between either position thereof.

ROBERT W. AYER.